Sheet 1-6 Sheets.
E. B. Bigelow.
Loom.
Nº 3,987. Patented Apr. 10, 1845.
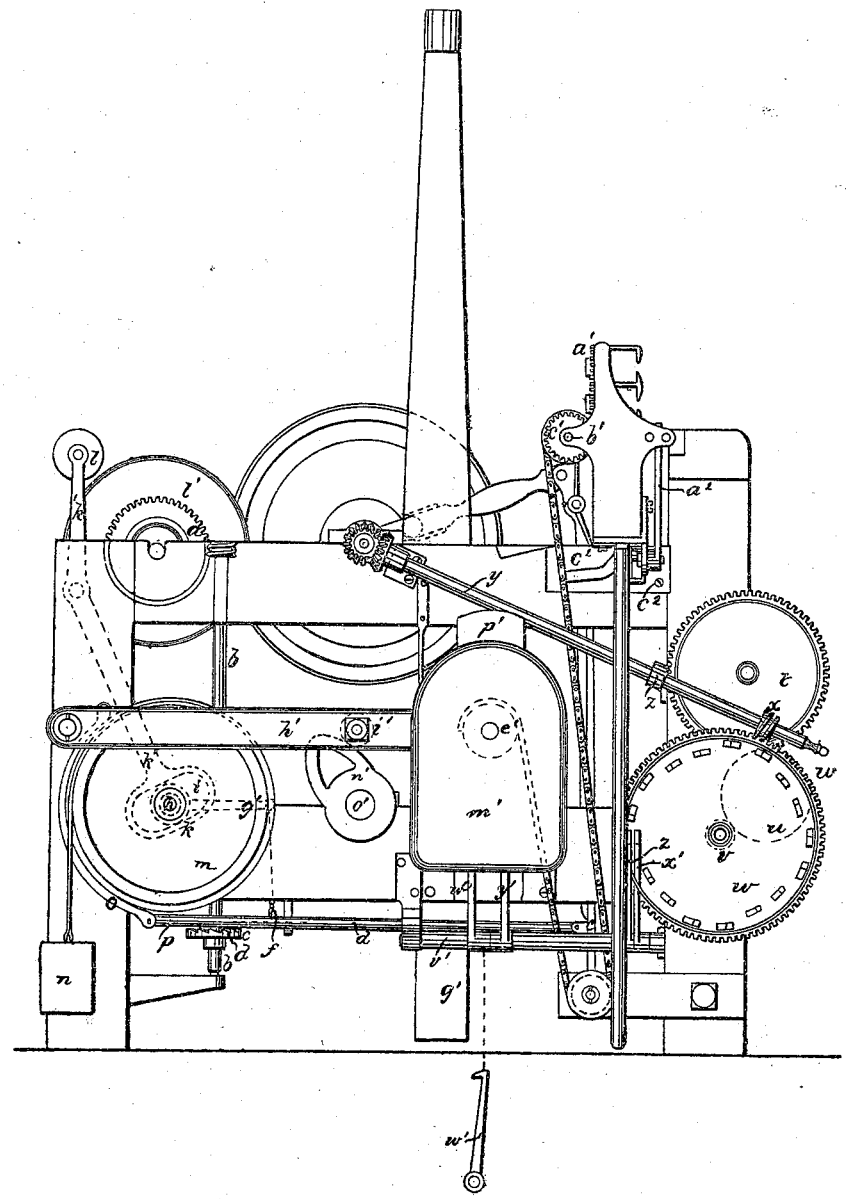

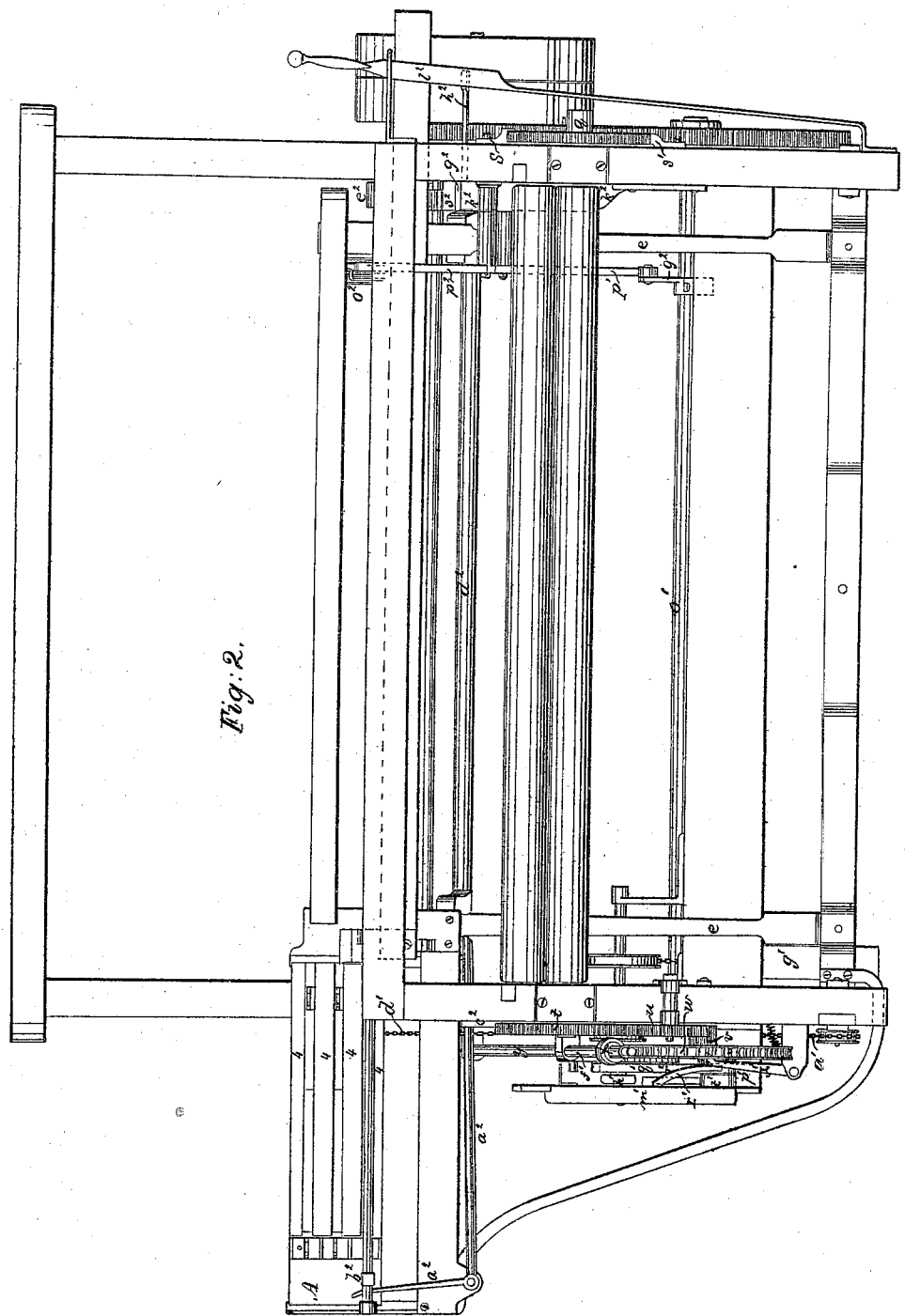

E. B. Bigelow.
Loom.
N° 3,987. Patented Apr. 10, 1845.
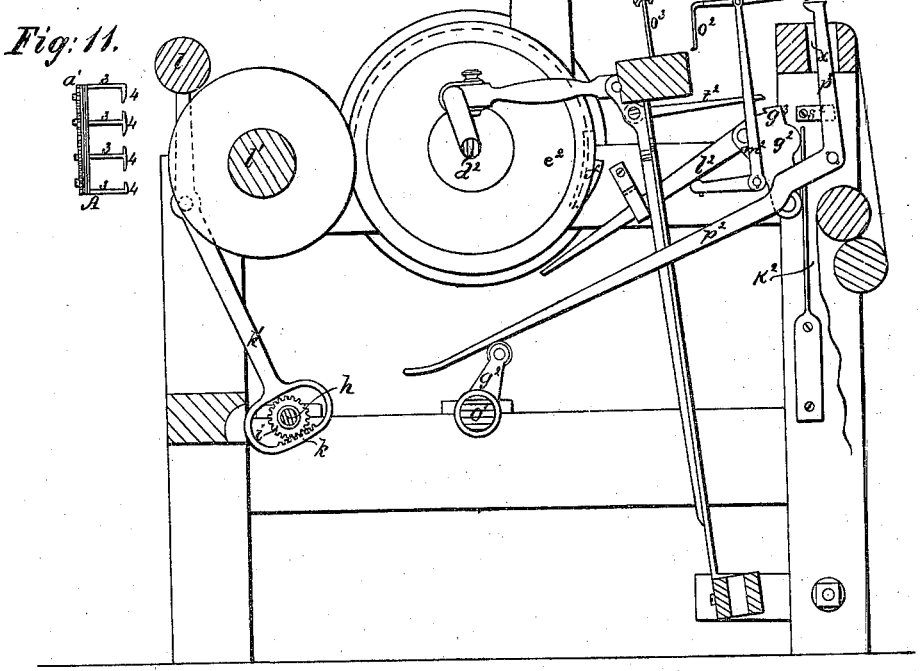

E. B. Bigelow.
Loom.

Nº 3,987.   Patented Apr. 10, 1845.

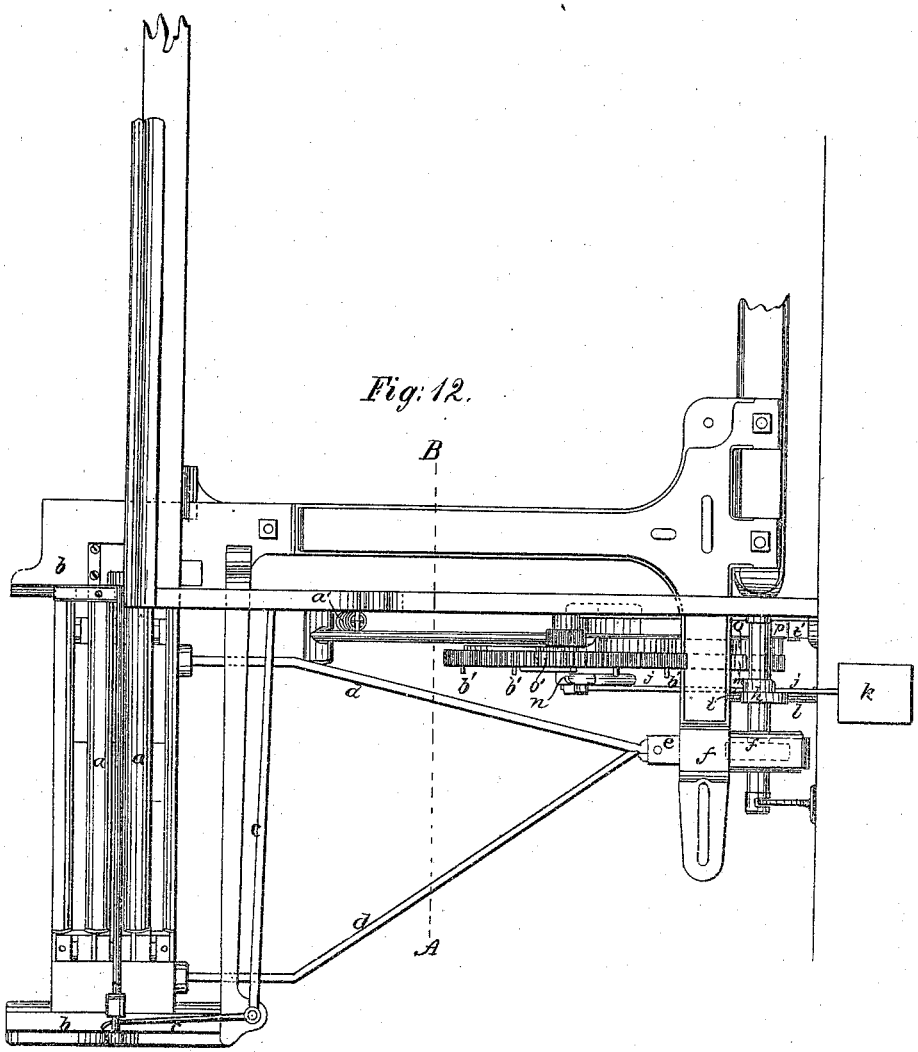

E. B. Bigelow.
Loom.

N.º 3,987. Patented Apr. 10, 1845.

UNITED STATES PATENT OFFICE.

ERASTUS B. BIGELOW, OF BOSTON, MASSACHUSETTS.

IMPROVEMENT IN POWER-LOOMS FOR WEAVING PLAIDS, &c.

Specification forming part of Letters Patent No. 3,987, dated April 10, 1845.

*To all whom it may concern:*

Be it known that I, ERASTUS B. BIGELOW, of Boston, in the county of Suffolk and State of Massachusetts, have invented several new and useful Improvements in Power-Looms for Weaving Plaids, Ginghams, and other Fabrics; and I do hereby declare that the following is a full, clear, and exact description thereof, reference being had to the accompanying drawings, which illustrate the same, in which—

Figure 6:
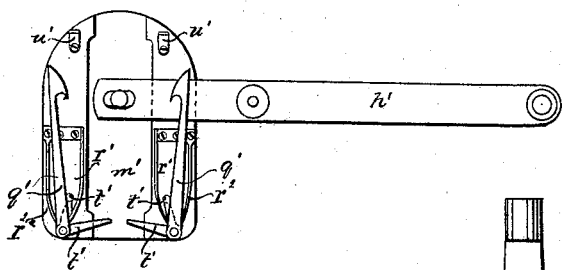
Figure 4:
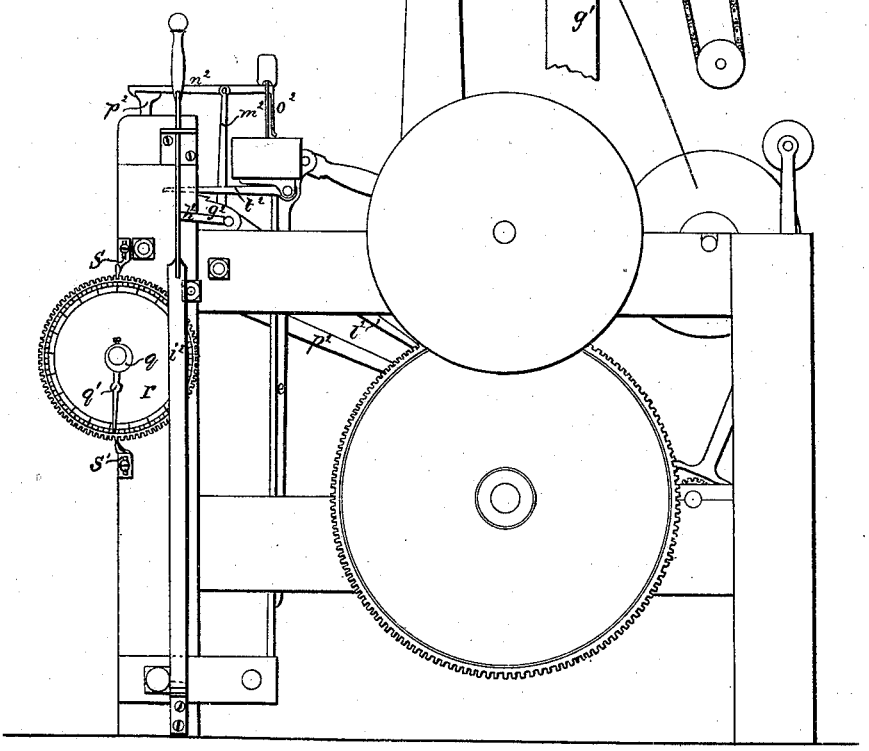
Figure 13:
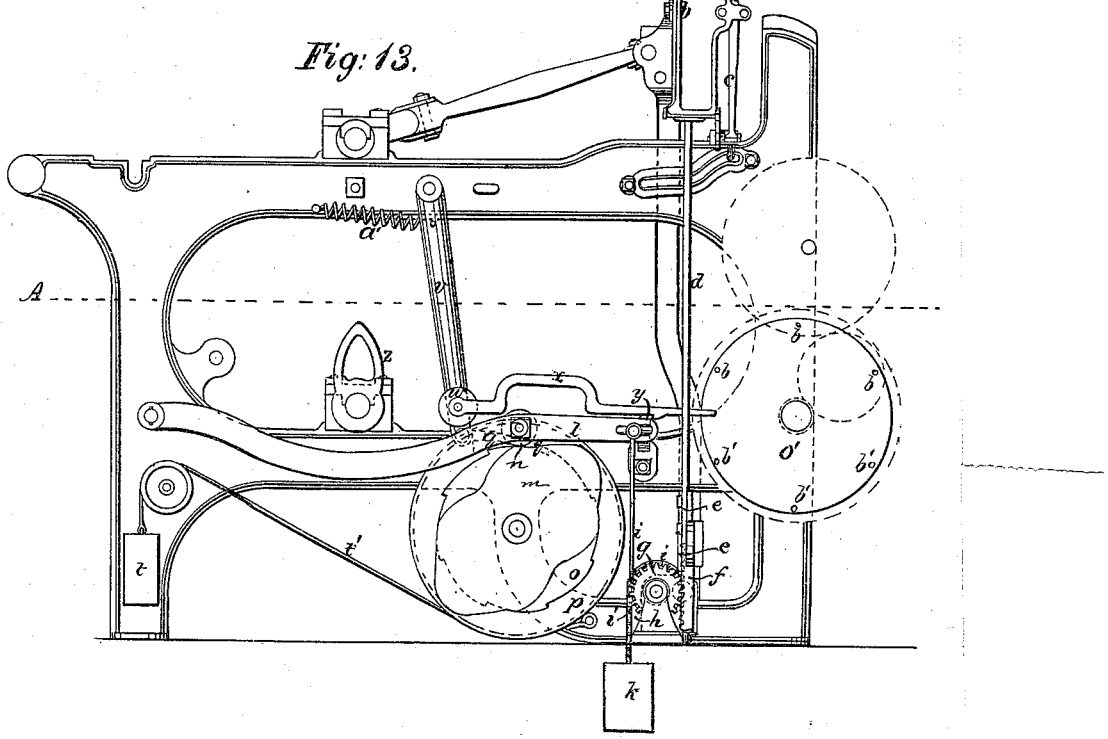

Figure 1 is an elevation of the left-hand side of the loom. Fig. 2 is the front elevation; Fig. 3, a section showing the right-hand half of the loom; Fig. 4, a right-hand side elevation; Figs. 8, 9, 10, and 11, parts composing the shuttle-boxes detached; Fig. 6, the inside of the weight for raising the shuttle-boxes next the loom. Figs. 12 and 13 are different views of a modification.

The nature of my invention consists in the mode of delivering out the warp, of taking up the finished cloth, and of measuring it as it is woven; the method of constructing, arranging, and operating the shuttle-boxes, arresting the shuttles, and then relieving their points from the pickers, thereby allowing the shuttle-boxes to move up and down freely, and the method of stopping the loom when the filling breaks or is exhausted.

Fig. 1 represents the parts connected with taking up the cloth, delivering the yarn, and the apparatus for changing the shuttle-boxes. The yarn-beam has on one end a spur-wheel $a$, into which works a worm-wheel or endless screw (shown by red lines in Fig. 1) on the upper end of an upright shaft $b$, that extends down nearly to the bottom of the frame, and is supported at its lower end in a step attached to the frame. A crown ratchet-wheel $c$ is fixed to this shaft near the lower end, into which a pawl or hand $d$ (represented by red lines) works. This pawl is extended forward far enough to be jointed to the sword $e$ of the lay and is moved to and fro with it. A chain or cord $f$ is attached to this hand, that connects it with an arm $g$, (in Fig. 1 this is dotted in, it being behind the frame,) which is on a shaft $h$, placed near the back part of the loom. On the same shaft are two pinion-wheels $i$, set near the ends just inside the frame. (More clearly shown in Fig. 3.) Into each of these a small segment-rack $k$ works, that forms the lower end of a vertical lever $k'$, the fulcrum of which is a stud fixed in the frame above. The upper ends of these two levers $k'$, one being on each side of the loom, support a vibrating yarn or tension roller $l$, over which the warp from the yarn-beam $l'$ passes to the harness. Outside the frame there is a double pulley $m$, affixed to the shaft $h$, over which a band passes and is attached and has a weight $n$ hanging to it, that by means of the rack $k$ and levers $k'$, as above described, with the roller $l$, keeps a uniform tension on the warp with the roller $l$ in any position. In the process of weaving the roller $l$ is drawn forward by warp as it is taken up by a movement to be described, by which the end of the arm $g$ is lowered with the pawl $d$ till said pawl comes in contact with the ratchet $c$, turns it, and delivers a portion of the warp. This lets the tension-roller again fall back, causes the arm $g$ and pawl $d$ to rise by means of the rack $k$ and pinion $i$, and the letting off ceases till again brought into action by the same cause.

To the side of the loom-frame, just beyond the periphery of the pulley $m$, is attached a break or band of thin metal $o$, that extends round about one-third of the circumference of the pulley $m$. This break is connected with the sword of the lay near its lower end, and as the lay vibrates forward the break $o$ is made to bind on the pulley $m$, hold it tight, and prevent the tension-roller from moving while beating up the cloth in any position said roller may chance to be at the time. A uniform strain is thus kept upon the warp as it is let off and it is not allowed to yield in beating up. Instead of a plain thin band for a break, as described above, the pulley can have a set of ratchet-teeth cut in it, and the break may be composed of a series of pawls of ordinary construction, which is so obvious that it is not represented in the drawings. This is only necessary when weaving heavy fabrics. To take up the cloth there is a shaft $y$ on the left side of the loom, (see Fig. 1,) that extends from the crank-shaft, with which it is connected by bevel-gearing, forward to a spur-wheel $w$, that it drives by means of a worm-wheel $x$. A pinion $v$ is connected on the same shaft with $w$. This pinion drives a small stud-wheel $u$, (almost entirely behind $w$ in Fig. 1,) that works into and drives a spur-wheel $t$, which is on the shaft of the measuring-roller outside the frame. The worm-wheel $x$ can be lifted out of gear when desired, its forward bearing being loose. On the opposite end of the shaft of the said measuring-roller, outside the frame, (see Fig. 4,) is affixed an eccentric $q$, on which a cog-wheel $r$ is put and turns freely. A hand $q'$ is fixed to the collar outside the wheel. Above this wheel a stationary tooth $s$ is fastened to the loom-frame with a pointer attached to it, the tooth $s$ just catching into those on the wheel when raised by the eccentric above named. Below the wheel and opposite to the tooth $s$ is another $s'$. This catches into the teeth of the wheel $r$ as it descends and causes it to rotate one tooth for every revolution of the measuring-roller and hand. An index is marked on the face of the wheel and by it the quantity of cloth woven is made known.

Figure 7:
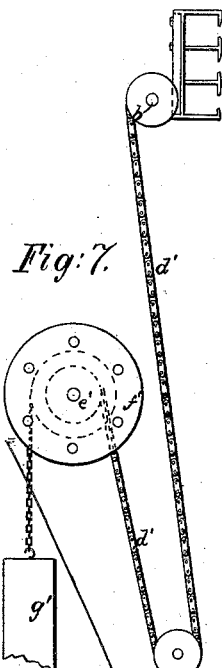

The construction of the shuttle-boxes is represented in the detached views of their parts, Figs. 8, 9, 10, and 11. Fig. 8 represents the back plate of the shuttle-boxes, (marked A.) It has a rack $a'$ cast onto it at each end, and just inside of these are two projections 1, extending from the top to the bottom, opposite to which on the face of the plate are corresponding recesses, as shown at Fig. 10 in the edge view of the plate at 22. This plate is grooved at each end to fit stationary ways attached to the lay, on which it slides up and down. Flat horizontal partitions 3 are attached to the back plate A at proper intervals, that form the divisions between the shuttle-boxes. They have small pieces 3' cast onto their inner edge that is next to the back plate. These fit into the recesses 2 in said plate, and by them the partitions are fastened to the plate. On the front edge of these partitions are flanges 4, (clearly represented in Fig. 11, an end view,) which project above and below said partition parallel with the back plate and form the fronts of the boxes, leaving a space along their whole length for the picker to play. This is a simple and efficient construction and admits of the adjustment of each partition. These boxes are moved by two pinions $c'$ on a shaft placed just behind the plate A, that work into the racks $a'$. On the same shaft with the pinions $c'$ there is a pulley, around which a chain $d'$ is fastened and descends down near to the fulcrum of the lay, round a pulley, and thence up to a pulley $e'$, situated behind the weight $m'$ in Fig. 1 and shown by red lines. The chain and pulleys are also represented in Fig. 7. A counter-weight $g'$ is connected by a chain with the pulley $e'$, that serves to counterbalance the shuttle-boxes. On the same shaft with $e'$ there is a wheel $f'$, from the face of which project six pins (more or less) toward the weight $m'$, (see Fig. 2,) by which it is turned in a manner about to be described.

The weight $m'$ is made to slide up and allowed to descend by its own gravity on a guide-plate $p'$, attached to the frame by means of a cam $n'$ on the cam-shaft $o'$, which acts on a lever $h'$, one end of which is connected with the frame, and to the other the weight $m'$ is attached. On the inner side of the weight $m'$ (represented at Fig. 6 detached from the loom) are affixed two hooks $q'$, one near each of the lower corners, that extend up on each side of the pin-wheel $f'$ above named. Stout springs $r'$, also fixed to the weight, bear against each hook and hold them out clear of the pins on wheel $f'$, and other smaller springs on the outside bear in the hooks from which the inside springs are removed, so as to catch on one of the pins on the wheel $f'$ and turn it as the weight falls, which causes the shuttle-boxes to move and change the shuttle. On the same fulcrums as the hooks $q'$ are quadrant or bent levers $t'$, one arm of each of which extends up and has its end turned in between the spring $r'$ and hook $q'$. The other arm turns inward horizontally. Below the weight $m'$ there is a horizontal shaft $v'$, parallel with and outside of the loom-frame. On this shaft there is a vertical arm $w'$, on the upper end of which, behind the weight, (see Fig. 1,) a hook is formed (this is shown below detached) that turns toward the weight. On the forward end of the same shaft another vertical arm $x'$ is affixed, the upper end of which turns in toward the face of the wheel $w$, above named, in a line with a series of cams that are placed around it near the circumference, and can be removed or their position changed at pleasure. When one of these cams strikes the arm $x'$, it bears it out and with it the arm $w'$, the hook on which catches the horizontal arm of one of the levers $t'$ as the weight $m'$ rises and relieves the hook $q'$ from the pressure of spring $r'$, thus allowing it to catch on one of the pins of wheel $f'$. By the side of the hook-arm $w'$ and cam-arm $x'$ there is a similar hook $y'$ and arm $z'$, which turn loosely on the shaft $v'$. These are connected together and move coincident with each other by means of another series of cams on wheel $w$ outside those above named. Their effect is precisely similar to those before described on the opposite hook $q'$ of the weight $m'$. Thus as one or the other of hooks $q'$ are brought into connection with the pin-wheel it is caused to revolve by the falling of the weight $m'$ in either direction, and raises or lowers the shuttle-boxes as the pattern requires, which can be varied by shifting the position of the cams on wheel $w$. By this arrangement it will be seen that if there is any obstruction to the descent of the weight or moving of the shuttle-boxes they will not move, which prevents the breaking of any of the parts, while it insures a constant action of the loom at other times.

A modification of this apparatus would be to substitute a spring-catch for a connection between the lever $h'$ and hook. This is represented in Fig. 5. The lever $h'$ has a square or diamond-shaped pin or stud $h^3$ projecting from its side at the forward end, which is embraced by two springs $i^3$, that fit onto it. These springs are joined together above and jointed to a flat plate $m^3$, made light, and put in place of the weight $m'$, above described, and with the same apparatus attached. The lever is moved up and down by a close cam $n^3$ of similar shape and substituted for the open cam $n'$. This moves the shuttle-boxes up and down with a positive motion, unless an obstacle is presented when the springs $i^2$ are forced open without breaking any of the parts. The object in this arrangement is to save lifting weight that might be deemed objectionable by some. It will also be obvious that this last arrangement can be made to move horizontally by sliding the lever $h'$ in that direction and modifying the other parts by which the same object is effected by analogous means.

To arrest the shuttle and then relieve the point of it from the picker, I make use of the following parts: At the outer end of the race-beam beyond the shuttle-boxes is the fulcrum of a bent or quadrant lever $a^2$, (see Figs. 1 and 2,) the vertical arm of which is a spring that extends up behind the picker $b^2$. The horizontal arm of this lever projects inward to the side of the loom-frame, where its end is received into a slot in a plate $c^2$, that runs diagonally, so that when the lay is thrown forward it raises that end of the lever, moves back the upper end of the vertical arm, and allows the picker to be drawn back in the usual way from the point of the shuttle, so that it can rise or fall without obstruction from that cause. When the lay returns back, the lever assumes the first position, and the picker is brought forward, ready to throw or receive and check the shuttle in the proper place.

The stop motion or apparatus for stopping the loom when the thread breaks or is exhausted, and the parts connected therewith are most clearly shown in the sections $a$, Fig. 3. A wheel $e^2$ is fixed on the crank or driving-shaft $d^2$ just inside the frame, having a tooth or small catch $f^2$ projecting from its periphery, for a purpose to be described. To the frame of the loom under the breast-beam a short stout lever $g^2$ is jointed, from which there is a projection on the side opposite to that shown in Fig. 3 and represented in Figs. 2 and 4. At $h^2$ this extends beyond the side of the loom and turns forward toward the spring-shipper $i^2$ of common construction. The lever $g^2$ is held a little inclined toward the lay by means of a strong spring $k^2$, affixed to the frame that rests against said lever, as is clearly represented in Fig. 3. A hand or protector $l^2$ is jointed to the lever $g^2$ near its upper end, that extends back a little, inclined downward toward the lower edge of the wheel $e^2$. It is guided by a projection from the frame, in which there is a slot to allow the lower end of the protector to rise and fall. A quadrant-lever $m^2$ is situated just behind the upright lever $g^2$, the horizontal arm of which extends back under the protector $l^2$. Its vertical arm projects above the breast-beam between it and the lay. To the upper end of $m^2$ a horizontal lever is jointed near its center, on the end of which, next the lay, are four fingers (more or less) that turn down at right angles. (Some of these are seen in Fig. 2.) At the end of the reed and opposite the fingers are several large dents, which when the lay comes up go in between the fingers above named if they are not carried forward by thread. A hook is formed on the forward end of lever $n^2$, that when the loom is to be stopped catches on the upper end of a bent lever $p^2$, that projects up through a slot $x$, cut in the breast-beam. From its fulcrum lever $p^2$ extends back down to the cam-shaft $o'$, when it comes in contact with a cam $q^2$, that raises it at every revolution or every other beat of the lay.

The operation of this apparatus is as follows: While the filling remains whole it is drawn by the shuttle across the dents at the end of the reed above named and prevents the fingers $o^2$ from passing through between them. This, as will be seen, raises the hook at the other end and clears it from the end of lever $p^2$ and the loom goes on; but if the filling breaks or is exhausted, so as not to cross the dents in the reed, the fingers $o^2$ pass through them and the hook on $n^2$ catches on the end of lever $p^2$, and as the cam $q^2$ raises its lower arm it carries forward the upper one, on which the hook is caught and with it levers $n^2$ and $m^2$, raises the horizontal arm of the latter, and brings the protector $l^2$, that rests thereon, up so as to be struck by the tooth $f^2$ on the wheel $e^2$ on the crank-shaft and arrests the motion of the loom by the momentum. Lever $g^2$, with the spring $k^2$, that bears against it, is forced forward against a stop $s^2$ on the frame, and the projection $h^2$ knocks off the shipper $i^2$ and changes the band from the fast to the loose pulley, while the recoil of the spring $k^2$, that was set by the forward motion of the lever $g^2$, throws back the lay and opens the shed. On the upper end of $g^2$ a notch $g^3$ is cut, (see Fig. 3,) into which the common protector $l^2$ on the protector-rod of the lay catches and stops the loom in the same manner, when the shuttle is not sent home into the box, as in the ordinary loom.

Fig. 12 is a front elevation of the left-hand end of the frame and lay, showing a form of construction of the apparatus for moving the shuttle-boxes. That I deem a modification of my machine, it being a combination of cams, &c., with a weight for that purpose. $a\ a$ are the shuttle-boxes; $b\ b$, the guides or ways on which they slide, as in the arrangement before described. $c\ c$ is the spring for arresting the shuttle, as above.

The ends of the sliding shuttle-boxes are supported on two rods $d\ d$, attached to the bottom thereof, that extend down vertically through the frame of the lay, from whence they converge till they join near the lay-shaft or fulcrum, where they have a rack $e$ attached to them, a side view of which is shown in the side elevation, Fig. 13. This rack slides in and is guided by the ways $f$, attached to the lay-shaft, and is moved up and down by the pinion $g$, on the shaft of which there is a pulley $h$, that has the end of a chain $i$ attached to it that winds round the pulley, and is connected at its other end with a vertical rod $j$, to the lower end of which a weight $k$ is suspended, its upper end being attached to a lever $u$, which extends back and has its fulcrum on the back post of the side frame of the loom. The weight $k$ is sufficiently heavy to raise the shuttle-boxes, and it will be evident that when the weight $k$ is raised the shuttle-boxes will fall, and vice versa. By lowering the weight it draws up the boxes. This movement is effected by means of a cam $m$, on which a roller $n$ rests that is on a stud projecting from the side of the lever $l$, said cam being formed by as many offsets or increasing projections as there are shuttles to be worked. The cam $m$ has a ratchet-wheel $o$ attached to it, and they revolve on a stud on the side of the frame. There is also a pulley $p$ connected with them on the same stud, around which a friction-strap $t'$ passes and over another pulley at the back of the frame, and thence to the weight $t$ fastened to it, which produces the proper friction to hold the cam $m$ in place when at rest.

Figure 14:
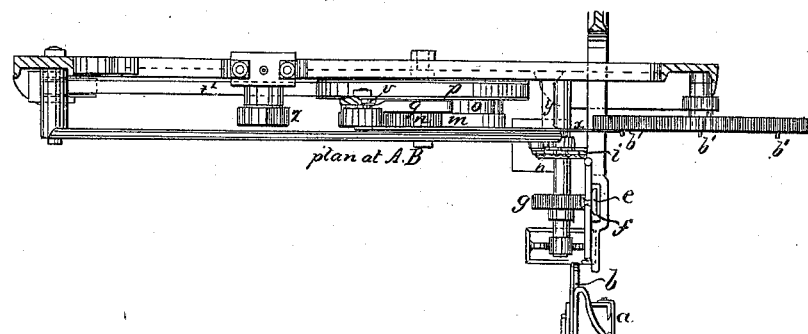

A lever $v$ is suspended by its upper end on a stud in the frame and hangs down a little below the center of the cam-shaft in front thereof. To its lower end a pawl $q$ (shown by dotted lines in the drawings) is jointed, that works into the ratchet-wheel $o$ and turns it when the arm or lever $v$ is thrown forward by a cam $z$ on the end of the cam-shaft outside the bearing, as clearly shown in Fig. 13, by striking a roller $w$ on said lever. A spring $a'$ is connected with the lever $v$ to draw it back against the cam $z$, and an arm $x$, with a hook on its end, is also connected with the lever projecting forward, and as the lever swings forward hooks on a catch $y$ and holds it in that position, as shown in the drawings. $o'$ is a measuring-wheel that has any number of pins $b\ b'$ projecting from its face, beyond which the front end of the above-named hook $x$ reaches, so that as the wheel $c'$ revolves one of said pins $b$ is brought into contact with the hook and raises it off the catch $y$ and allows the lever $v$ to be brought again into contact with cam $z$, and as it is again thrown forward the pawl on its end causes the ratchet-wheel $o$ to turn and with it the cam $m$, which by the arrangement above described raises or lowers the shuttle-boxes. It will be observed by the shape of the cam that the boxes would be raised and lowered consecutively; but it is obvious that any other order of changing could be accomplished by a different cam. The top plan of this arrangement is shown in Fig. 14.

What I claim as my invention, and desire to secure by Letters Patent, is—

1. The combination of the tension or yarn roller with the letting-off motion, so that when the yarn-roller is drawn forward by the process of weaving the let-off is put in motion, which relieves the yarn-roller and allows it to fall back and thus stop the let-off; and in combination with the above the break $o$ for preventing the yarn-roller from moving while beating up the cloth.

2. In combination with the measuring-rollers, the index-wheel $v$ and hand $q$ for measuring the cloth, as described.

3. The combination of the shuttle-boxes with the weight or spring by means of the chain $d'$ and pulleys and pin-wheel $f'$, with which the weight $m'$ is made to connect to change the pattern while the machinery is guarded against injury if the shuttle should not be sent home.

4. In combination with the pickers, the spring-lever $a^2$, arranged and operated as above described, so as to arrest the shuttle as it enters the box, and then to fall back to clear the point of the shuttle before the box changes.

5. The combination of the apparatus for stopping the loom—that is to say, the combination of the fingered lever $n^2$ with the levers $p^2$ and $m^2$, in the manner described; and in combination with the above the protector and stop on the wheel $e^2$ to arrest the motion of the crank-shaft and throw off the shipper.

E. B. BIGELOW.

Witnesses:
N. W. APPLETON,
WM. C. APPLETON.